United States Patent [15] 3,673,349
Berg et al. [45] June 27, 1972

[54] ROTARY HEAD ASSEMBLY FOR TAPE TRANSPORT WITH AMPLIFIER CARRIED BY THE ROTOR

[72] Inventors: Peter Berg, San Jose; Bertil C. Linder, Milpitas, both of Calif.

[73] Assignee: Cartridge Television, Inc., New York, N.Y.

[22] Filed: June 26, 1970

[21] Appl. No.: 50,060

[52] U.S. Cl. ....................179/100.2 T, 178/6.6 A
[51] Int. Cl. ....................G11b 5/44, G11b 15/12
[58] Field of Search ............179/100.2 T; 178/6.6 A, 6.6 HS, 178/100.2 S

[56] References Cited

UNITED STATES PATENTS

| | | | |
|---|---|---|---|
| 2,932,696 | 4/1960 | Shipman, Jr. | 179/100.2 S |
| 3,317,680 | 5/1967 | Porter | 179/100.2 T |
| 3,377,436 | 4/1968 | Maxey et al. | 179/100.2 T |

*Primary Examiner*—Stanley M. Urynowicz, Jr.
*Assistant Examiner*—Alfred H. Eddleman
*Attorney*—Townsend and Townsend

[57] ABSTRACT

An assembly for mounting a number of magnetic heads on a rotor for rotation about a central axis and for electrically connecting the heads to a commutator on the rotor wherein the heads are secured to the rotor adjacent to its outer periphery for scanning a flexible, magnetic tape disposed adjacent to and along a portion of the arcuate path of travel of the heads. Amplifier means carried by the rotor electrically couples the commutator with each head, respectively. A switch network can be carried by the rotor and actuated by a transducer to effect sequential switching between the heads as a function of the rotation of the rotor.

10 Claims, 3 Drawing Figures

INVENTORS
PETER BERG
BERTIL C. LINDER
BY Townsend and Townsend
ATTORNEYS

ROTARY HEAD ASSEMBLY FOR TAPE TRANSPORT WITH AMPLIFIER CARRIED BY THE ROTOR

This invention relates to improvements in tape transport systems and, more particularly, to an improved rotary head assembly for such a system.

In a tape transport system having a rotary head assembly, the magnetic heads are mounted adjacent to the outer periphery of a rotor so that the heads can scan a flexible, magnetic tape as the latter is disposed adjacent to and moves along a portion of the arcuate path of travel of the heads. Generally, the longitudinal axis of the tape is out of the plane of rotation of the rotor so that the heads can scan the tape along oblique tracks. In this way, the record tracks on the tape can be relatively long to permit an entire field of a video image frame to be placed on each track. Moreover, this geometry allows the use of the skip-field technique for record and playback of video signals.

In the prior art the rotor which mounts the heads has a commutator at the center thereof so that the video signals sensed by the heads during a playback mode can be directed to circuitry which is external to the rotary head assembly itself. Also, for a record mode, the commutator interconnects the video signal source with at least one of the heads. In either mode, the head or heads are connected directly to the commutator.

The foregoing practice presents a noise problem due to the generation of noise because the commutator rings rotate relative to the brushes which engage the rings. Such noise is added to the video signal directed to the commutator from the heads in a playback mode and is amplified in the circuitry externally of the rotor.

The present invention provides an improvement over the rotary head assemblies of conventional construction by providing an assembly having a rotor on which a number of heads mounted thereon have amplifier means coupling each head, respectively, with the commutator. In this way, the video signals sensed by the heads during a playback mode are amplified before being directed to the commutator. Thus, any noise generated by the commutator itself will represent only a relatively small fraction of the signal transferred by the commutator to the electronic circuitry externally of the head assembly. The signal-to-noise ratio of the video signals, therefore, will be relatively high.

The head assembly of this invention can also include a record amplifier mounted on the rotor along with the playback amplifiers for the heads. Thus, video signals to be recorded need not be amplified until they have passed through the commutator to thereby assure that energy radiation due to the video signals will be minimized since connecting leads between the record amplifier and the record head can be kept relatively short.

A rotary head assembly of this invention can also be used to support a head-switching network and the magnetic or optical transducer which is used to actuate the switching network to effect switching between the various heads on the rotor itself. Thus, the switching network can be coupled to the heads downstream of their amplifiers and upstream of the commutator to assure that the video signals sensed by the heads are sequentially applied to the commutator before being directed to the playback circuitry externally of the rotor.

The primary object of this invention is, therefore, to provide an improved rotary head assembly for a tape transport wherein the rotor for such an assembly has amplifying means thereon for coupling each head thereof and the associated commutator for amplifying the signals sensed by each head before the directing of signals through the commutator to external circuitry to thereby minimize the effect of the noise generated by the commutator itself and to provide output signals having an improved high signal-to-noise ratio.

Another object of this invention is to provide a rotary head assembly of the type described wherein the amplifier for each head is mounted on a printed circuit board removably carried by the rotor and surrounding the commutator so that the amplifiers will be in positions to easily couple the respective heads to the commutator.

Other objects of this invention will become apparent as the following specification progresses, reference being had to the accompanying drawing for an illustration of an embodiment of the invention.

Figure 1:
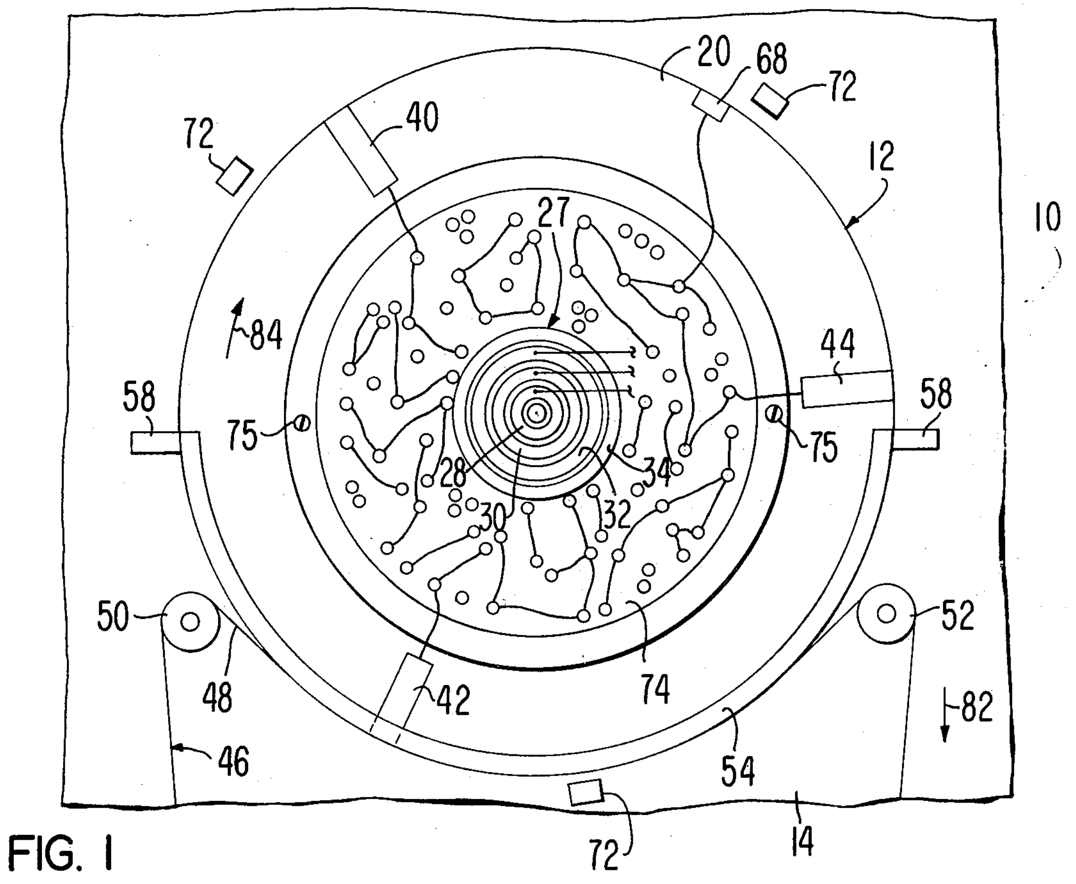
FIG. 1 is an elevational view of a rotary head assembly utilizing the present invention.

The rotary head assembly which is the subject matter of this invention is broadly denoted by the numeral 10 and is adapted to form a part of a tape transport system for recording and/or playback operations with a flexible, magnetic tape. Assembly 10 includes a rotor 12 mounted adjacent to a base plate 14 for rotation about a central axis defined by the drive shaft 16 of a drive motor 18 mounted in any suitable manner on the base plate. Rotor 12 includes a disk 20 secured to drive shaft 16 for rotation therewith and a ring 22 on one surface 24 of disk 20. The ring can either be secured in any suitable manner to the disk or be integral therewith. Disk 20 also has a central support 26 on which a commutator 27 is mounted, the commutator having a number of rings 28, 30, 32 and 34 mounted thereon. Support 26 and the commutator rings rotate with disk 20 when motor 18 is energized. Also, ring 22 and support 26 define a space or well 76 which surrounds support 26.

A number of brushes disposed in sliding engagement with at least certain of the commutator rings are carried by respective, resilient arms 36 secured to a suitable support 38 forming a part of the tape transport system and which can be secured in any suitable manner to base plate 14. Thus, the brushes can remain stabilized in substantially fixed positions with respect to the commutator. The brushes are electrically connected to circuitry (not shown) externally of assembly 10 which receive the signals transferred to the brushes from the commutator rings.

Disk 20 has a number of circumferentially spaced magnetic heads 40, 42 and 44 mounted thereon adjacent to the outer periphery thereof. The heads are disposed to scan a flexible, magnetic tape 46 when a stretch 48 of the tape extends along a portion of the arcuate path of travel of the heads. A pair of tape guides 50 and 52 (FIG. 1) coupled to base plate 14 positions the tape in a manner such that the longitudinal axis of the tape is at an angle with respect to the plane of rotation of disk 20. Thus, the heads will scan the tape along oblique tracks, whereby the working surface of the tape can be most effectively utilized.

The tape is contoured into an arcuate shape by a pair of arcuate tape guides 54 and 56 (FIG. 2) mounted on base plate 14 in any suitable manner, such as by supports 58 on opposed sides of the outer periphery of disk 20. Guides 54 and 56 operate to present the tape to the heads for scanning thereby as the heads rotate under the influence of disk 20 and as the tape advances in a predetermined direction under the influence of a tape drive capstan (not shown). For purposes of illustration, rotor 12 rotates in the direction of arrow 84 (FIG. 1) and tape 46 moves in the direction of arrow 82. Tape guide 54 is illustrated in FIG. 1, tape guide 56 being aligned with tape guide 54 so as to present a pair of cylindrical surfaces on respective sides of the outer periphery of disk 20.

Figure 2:
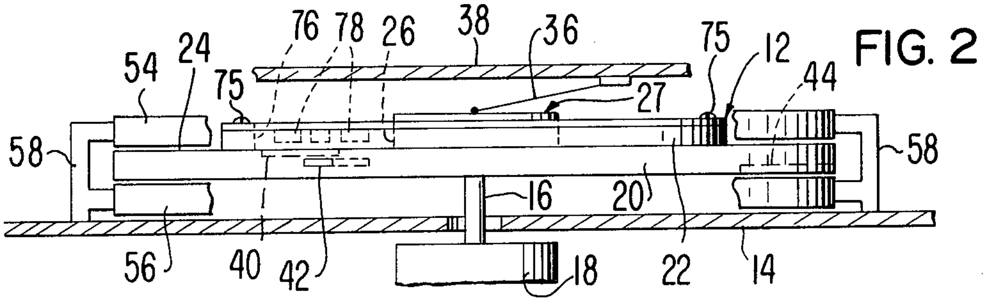
FIG. 2 is an end elevational view, partly in section, of the assembly.
Figure 3:
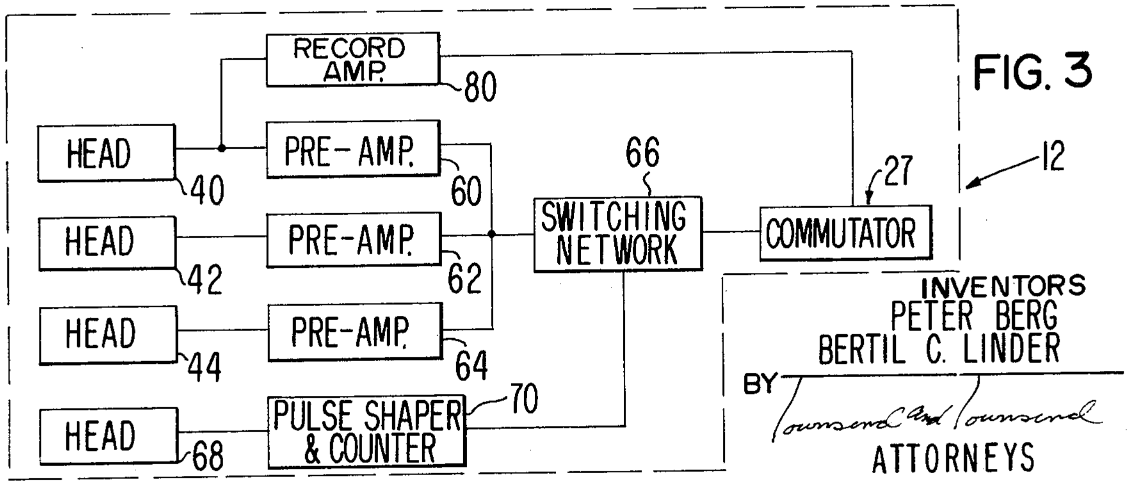
FIG. 3 is a schematic diagram, in block form, of a transducer and pick-off system employing rotatably mounted amplifiers in accordance with the invention.

The heads are disposed on the disk in generally parallel planes as shown in FIG. 2, whereby assembly 10 can utilize the skip-field technique in recording and playing back video signals. In utilizing this technique, one of the heads is used for recording signals on the tape and records only selected fields of a series of successive video image frames, such as every third field of such a series of frames. The length of each record track on the tape can be sufficiently long so that it contains the signals corresponding to each recorded field. During playback, all of the heads scan each record track for each revolution of disk 20 and the signals from the heads are successively applied to playback circuitry with the result being a video picture of acceptable quality. As shown in FIG. 2, head 40 is above head 42 and head 44 is below head 42. The distances between the heads are exaggerated to illustrate the fact that the heads are in parallel planes.

Circuitry carried by disk 20 interconnects the heads with commutator 27. Such circuitry includes pre-amplifiers 60, 62 and 64 for heads 40, 42 and 44, respectively, a switching network 66 controlled by a magnetic or optical transducer 68 carried by the disk 20 near its outer periphery and a pulse shaper and counter 70 coupling the signal output of transducer 68 with switching network 66. Transducer 68 moves past and is sensitive for a number of actuating devices 72 (FIG. 1) carried in fixed positions by base plate 14 for generating signals in the transducer which are directed through pulse shaper and counter 70 to switching network 66 to sequentially actuate the latter as a function of the angular position of the transducer. Thus, the signal outputs of pre-amplifiers 60, 62 and 64 can be sequentially coupled with the commutator. Each device 72 can be magnetic in nature to generate a signal in transducer 68 as the latter passes the device. The generated signal is used to trigger or actuate switching network 66.

Pre-amplifiers 60, 62 and 64 and pulse shaper and counter 70 are carried by a support in the nature of a printed circuit board 14 removably secured in any suitable manner, such as by screws 75, to ring 22 on disk 20. Board 74 is in the form of an annular ring whose inner periphery surrounds commutator 27. The various components 78, such as transistors, capacitors, resistors and the like, which form parts of the pre-amplifiers and the pulse shaper and counter can extend into well 76 within ring 22, the well being substantially covered by board 74. The various wiring connections, shown in FIG. 1, can extend across the outer surface of board 74. Also, components 78 can be adjacent to the outer surface of board 74 as well as adjacent to the inner surface thereof.

Heads 40, 42 and 44 are directly connected to the signal inputs of respective pre-amplifiers mounted on board 74. The signal outputs of the pre-amplifiers are coupled to the input of switching network 66. The output of network 66 is coupled to commutator 27.

A record amplifier 80 can also be carried on board 74 and coupled to one of the heads, for instance, head 40. The signal input of record amplifier 80 is coupled with the commutator and its signal output is coupled to the head. Signals to be recorded on a magnetic tape by head 40 are directed through the commutator before they are amplified, following which the signals are amplified by a record amplifier 80 and then directed to head 40 which scans the tape. Thus, high energy r.f. signals can be more easily confined to the vicinity of head 40 to minimize radiation effects and thereby eliminate the need for elaborate shielding since connector leads can be relatively short in length.

In operation, disk 20 is set into rotation by energizing motor 18. Tape 46 will have been coupled with tape guides 50 and 52 so that tape stretch 48 extends along guides 54 and 56 and is contoured thereby. The tape is advanced in the direction of arrow 82 by a tape drive capstan and motor 18 rotates disk 20 in the direction of arrow 84 (FIG. 1).

For a playback operation, heads 40, 42 and 44 scan tape stretch 48 along pre-recorded tape tracks thereon and sense the signals recorded on the tracks. The heads are arranged to utilize the skip-field technique; thus, the heads, for each revolution of disk 20, will scan a particular track successively.

The signals sensed by the heads are directed to respective pre-amplifiers 60, 62 and 64 and the output signals of the pre-amplifiers are directed to switching network 66 controlled by transducer 68 under the influence of device 72. Thus, the output of switching network 66 will be successive signals from heads 40, 42 and 44 amplified by respective pre-amplifiers and such output signals will be directed sequentially to commutator 27 for transfer to the external playback circuitry remote from assembly 10.

For a record mode, a signal is directed from a signal source externally of assembly 10 to record amplifier 80 through commutator 27 and the output of amplifier 80 is directed to head 40. Thus, as disk 20 rotates, head 40 will scan tape 46 and cause the amplified signals from amplifier 80 to be recorded on oblique tracks on the tape.

In a playback mode, therefore, pre-recorded signals on the tape which are sensed by the heads are amplified before the signals are transferred by the commutator to the external circuitry. Thus, any noise generated by the commutator and added to the output signals will be a small fraction of the overall signal amplitude so that the signal-to-noise ratio of the output signals will remain appreciably high. Also, the placement of record amplifier 80 on board 74 allows the various connecting leads of the amplifier to be relatively short. This assures that any energy radiated during signal transfer from amplifier 80 to head 40 will be minimal so that shielding is either not needed or is needed to a very limited extent.

We claim:

1. A rotary head assembly for a tape transport comprising:
a rotor having an outer periphery;
a number of heads secured to the rotor at spaced locations thereon adjacent to the outer periphery thereof;
means mounting the rotor for rotation about a central axis therethrough;
a commutator secured to the rotor adjacent to said central axis;
individual amplifiers for said heads, said amplifiers being mounted on the rotor for rotation therewith, each amplifier having a signal input coupled to the respective head and a signal output;
an actuatable switching network mounted on the rotor for rotation therewith, said switching network having a signal input coupled to the signal outputs of the amplifiers and a signal output coupled to the commutator; and
means carried by the rotor and responsive to the angular position thereof for successively actuating said switching network to cause the output signals of the amplifiers to be sequentially coupled to the commutator.

2. A rotary head assembly as set forth in claim 1, wherein is provided a support secured to the rotor, said amplifiers and said switching network being secured to the support and movable with the rotor.

3. A rotary head assembly as set forth in claim 2, wherein said support includes a printed circuit board.

4. A rotary head assembly for a tape transport comprising: a rotor having an outer periphery; means mounting the rotor for rotation about a central axis therethrough; means coupled with the rotor for rotating the same about said central axis; a number of read-write heads mounted on said rotor at spaced locations thereon adjacent to said outer periphery thereof, said heads being disposed to scan an arcuate stretch of a magnetic tape movable along a portion of the arcuate path of travel of the heads; a commutator secured to the rotor concentric with said central axis thereof; a ring carried by the rotor and extending outwardly therefrom in spaced, concentricity with said commutator to present a well inwardly of the ring; a printed circuit board releasably secured to the ring and surrounding the commutator and substantially covering the well; a pre-amplifier for each head, respectively, the pre-amplifiers being secured to the printed circuit board and having parts extending into said well, each pre-amplifier having a signal input coupled with a respective head and a signal output; an actuatable switching network having a signal input coupled with the signal outputs of said pre-amplifiers and a signal output coupled with the commutator; a transducer carried by the rotor adjacent to said outer periphery; and a pulse-shaping device interconnecting the transducer with the switching network to cause action of the latter by the transducer as a function of its position about said central axis, whereby the switching network can be actuated to interconnect a pre-amplifier with said commutator when the corresponding head moves in scanning relationship to said tape stretch.

5. A rotary head assembly as set forth in claim 4, wherein is included a pair of arcuate tape guides mounted in fixed positions on opposite sides of said outer periphery and disposed to contour a flexible, magnetic tape extending along and adjacent to said outer periphery of the rotor.

6. A rotary head assembly as set forth in claim 4, wherein is included a record amplifier secured to the printed circuit board and having a signal input coupled with the commutator and a signal output coupled with one of the heads.

7. A rotary head assembly for a tape transport comprising:
a rotor having a central axis and an outer periphery;
a number of heads secured to the rotor at angularly spaced locations thereon and adjacent to the outer periphery thereof;
means mounting the rotor for rotation about said central axis;
a commutator secured to the rotor adjacent to said central axis;
a ring member in surrounding, spaced relationship to the commutator to present a well between the ring member and the commutator;
a printed circuit board releasably secured to the ring to substantially cover said well;
individual amplifiers for the heads, each amplifier having a signal input coupled to the respective head and a signal output;
an actuatable switching network, said switching network having a signal input coupled to the signal outputs of the amplifiers and a signal output coupled to the commutator;
said amplifiers and said switching network having circuitry incorporated in the board and elements secured to the board and extending into the well, whereby the amplifier and the switching network rotate with the rotor; and
means carried by the rotor and responsive to the rotation thereof for successively actuating said switching network to cause the output signals of the amplifiers to be sequentially coupled to the commutator.

8. A rotary head assembly for a tape transport comprising:
a rotor having a central axis and an outer periphery;
a number of heads secured to the rotor at spaced locations thereon adjacent to the outer periphery thereof;
means mounting the rotor for rotation about said central axis;
a pair of arcuate, stationary tape guides individually located on opposite sides of the rotor in alignment with the outer periphery thereof with the tape guides being disposed to contour a flexible, magnetic tape along a portion of the arcuate path of travel of the heads,
a commutator secured to the rotor adjacent to said central axis;
individual amplifiers for said heads, the amplifiers being mounted on the rotor for rotation therewith, each amplifier having a signal input coupled to the respective head and a signal output;
an actuatable switching network mounted on the rotor for rotation therewith, said switching network having a signal input coupled to the signal outputs of the amplifiers and a signal output coupled to the commutator; and
means carried by the rotor and responsive to the rotation thereof for successively actuating said switching network to cause the output signals of the amplifiers to be sequentially coupled to the commutator.

9. A rotary head assembly for a tape transport comprising:
a rotor having a central axis and an outer periphery;
a number of heads secured to the rotor at spaced locations thereon adjacent to the outer periphery thereof;
means mounting the rotor for rotation about said central axis;
a commutator secured to the rotor adjacent to said central axis;
individual amplifiers for said heads, the amplifiers being mounted on the rotor for rotation therewith, each amplifier having a signal input coupled to the respective head and a signal output;
an actuatable switching network mounted on the rotor for rotation therewith, said switching network having a signal input coupled to the signal outputs of the amplifiers and a signal output coupled to the commutator; and
a transducer secured to the rotor adjacent to the outer periphery of the rotor and responsive to the rotation of the rotor for successively actuating said switching network to cause the output signals of the amplifiers to be sequentially coupled to the commutator.

10. A rotary head assembly for a tape transport comprising:
a rotor having a central axis and an outer periphery;
a number of heads secured to the rotor at spaced locations thereon adjacent to the outer periphery thereof;
means mounting the rotor for rotation about said central axis;
a commutator secured to the rotor adjacent to said central axis;
individual playback amplifiers for said heads, the playback amplifiers being mounted on the rotor for rotation therewith, each playback amplifier having a signal input coupled to the respective head and a signal output;
an actuatable switching network mounted on the rotor for rotation therewith, said switching network having a signal input coupled to the signal outputs of the playback amplifiers and a signal output coupled to the commutator;
means carried by the rotor and responsive to the rotation thereof for successively actuating said switching network to cause the output signals of the playback amplifiers to be sequentially coupled to the commutator, and
a record amplifier coupled with the rotor for rotation therewith, said record amplifier having a signal input coupled to the commutator and a signal output coupled to one of said heads.

* * * * *